June 19, 1945.  G. F. HALL  2,378,844
HYDRAULIC POWER TRANSMISSION
Filed Jan. 22, 1942  3 Sheets-Sheet 1
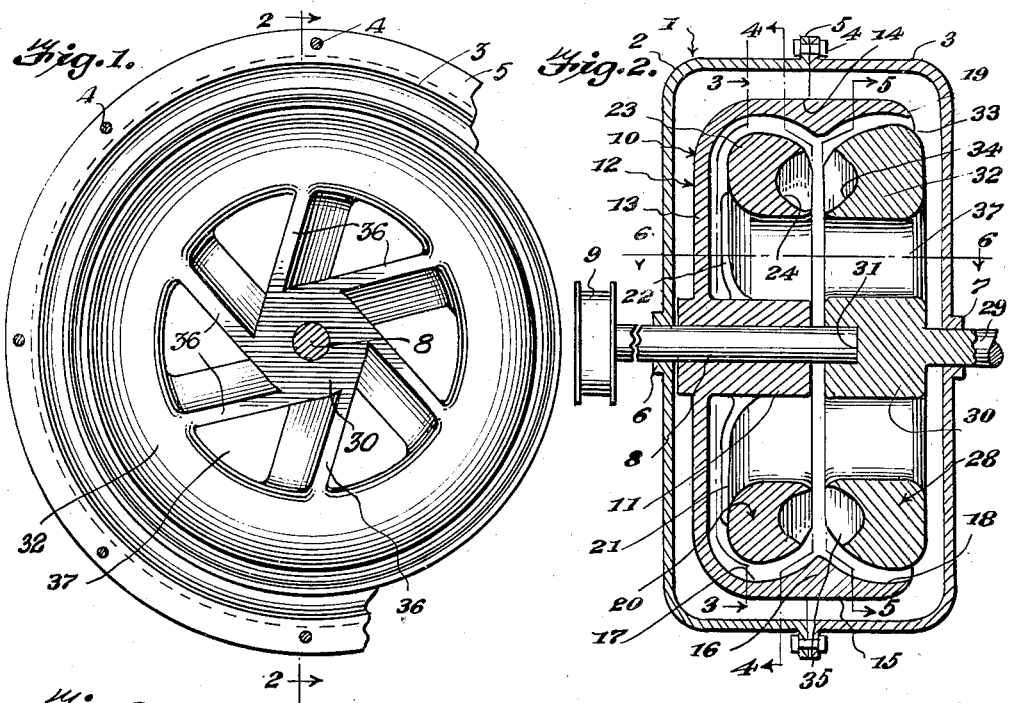
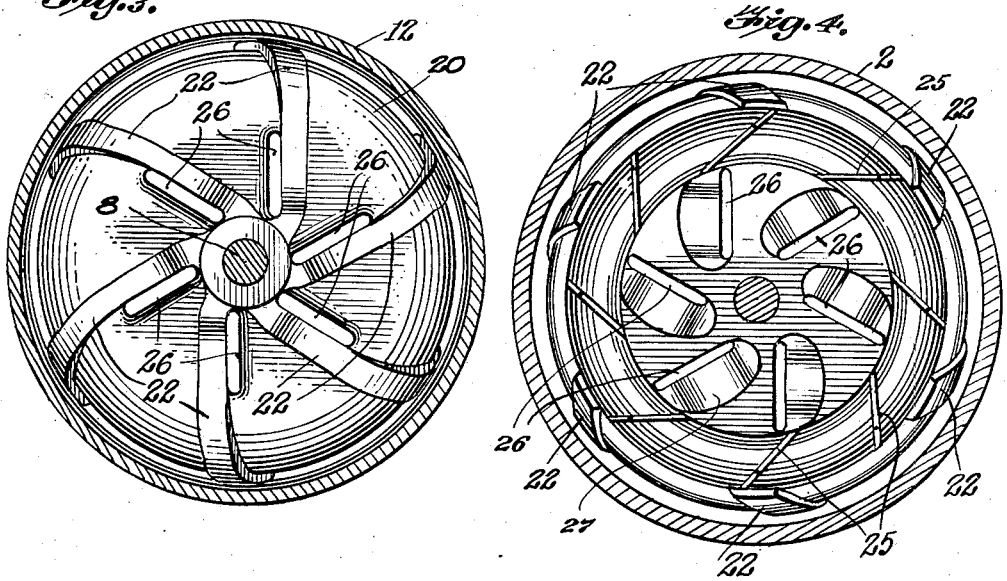
Inventor
GEORGE F. HALL
By Lacey & Lacey,
Attorneys June 19, 1945.  G. F. HALL  2,378,844
HYDRAULIC POWER TRANSMISSION
Filed Jan. 22, 1942  3 Sheets-Sheet 2
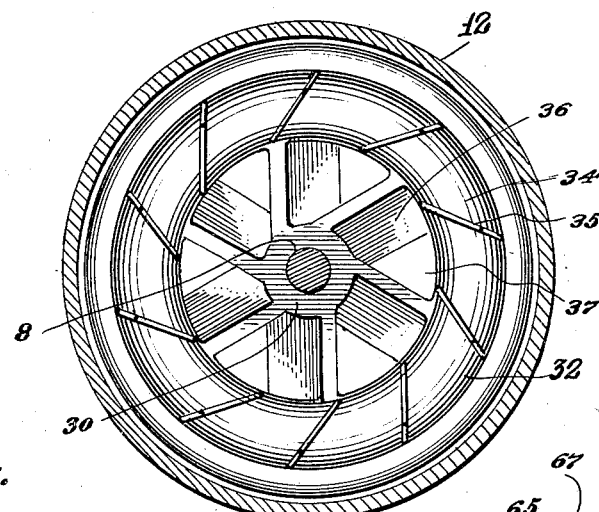
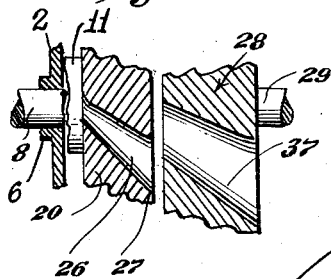
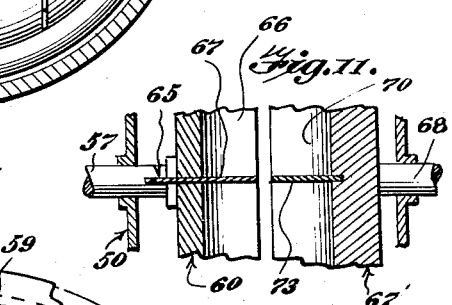
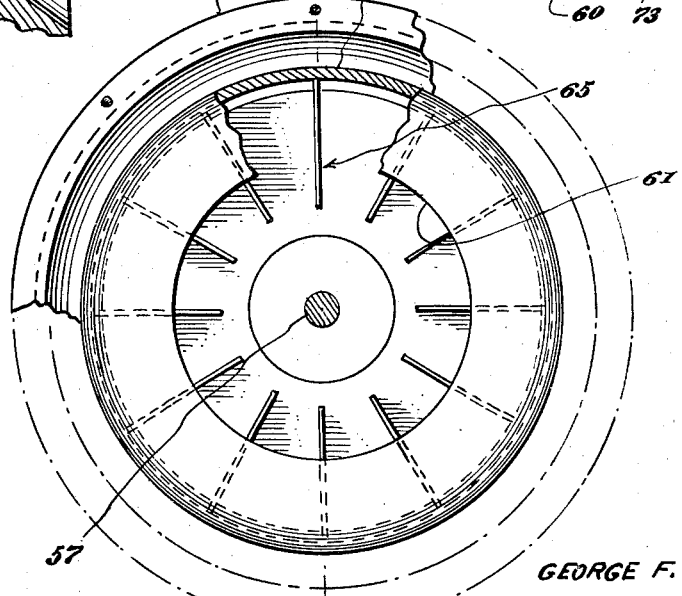
Inventor
GEORGE F. HALL
By Lacey & Lacey,
Attorneys

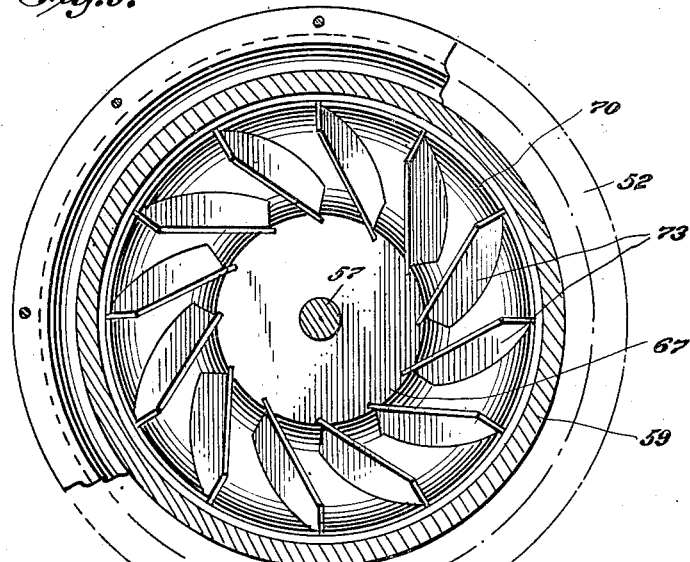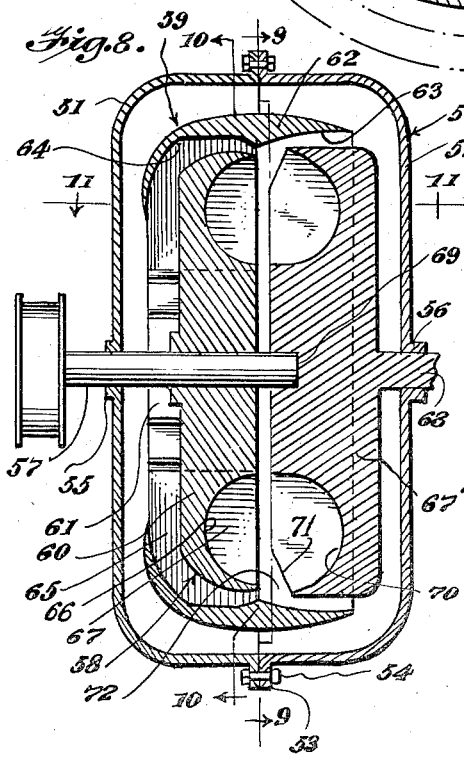

Patented June 19, 1945

2,378,844

UNITED STATES PATENT OFFICE 2,378,844

HYDRAULIC POWER TRANSMISSION

George F. Hall, Manchester, N. H.

Application January 22, 1942, Serial No. 427,807

2 Claims. (Cl. 60—54)

This invention relates generally to transmission mechanisms and more particularly to an improved hydraulic power transmission.

One of the principal objects of the invention is to provide a hydraulic power transmission wherein a flow of fluid cooperates with a second fluid flow for imparting maximum rotative energy to the rotors employed with the result that maximum power transfer will be effected.

A further object of the invention is to provide a transmission system of this type wherein maximum kinetic energy is absorbed from a centrifugally impelled flow of fluid.

A further object of the invention is to provide a hydraulic power transmission which is simple in construction and which will be highly efficient in use.

Other objects of the invention will become apparent during the course of the following description.

In the drawings:

Figure 1 is a rear elevation, partly in section, showing the driven rotor with one section of the casing removed, Figure 2 is a vertical sectional view on the line 2—2 of Figure 1 looking in the direction indicated by the arrows, Figure 3 is a vertical sectional view on the line 3—3 of Figure 2, Figure 4 is a vertical sectional view on the line 4—4 of Figure 2, Figure 5 is a vertical sectional view on the line 5—5 of Figure 2, Figure 6 is a fragmentary horizontal sectional view on the line 6—6 of Figure 2 with portions omitted, Figure 7 is a vertical sectional view, partly in elevation, showing a modified embodiment of the invention, Figure 8 is a vertical sectional view on the line 8—8 of Figure 7, Figure 9 is a vertical sectional view on the line 9—9 of Figure 8, Figure 10 is a vertical sectional view on the line 10—10 of Figure 8, and Figure 11 is a detail horizontal sectional view on the line 11—11 of Figure 8.

In describing my invention reference will first be had to disclosure contained in Figures 1 through 6 of the drawings.

The numeral 1 indicates in general the casing which is formed of cast metal or other suitable material and which includes sections 2 and 3. The casing 1 is substantially cylindrical and the sections thereof are held in proper operative relation by bolts 4 which extend through mating flanges 5. Formed on the sections 2 and 3, axially thereof, are bosses which define, respectively, bearings 6 and 7. The bearing 6 rotatably receives a driving shaft 8, said driving shaft extending through the section 2 of the casing 1 and into the section 3 thereof. The driving shaft 8 is adapted for connection with a driving element 9 which is, by well known means, connected with the crank shaft or with the conventional transmission of a motor vehicle.

It should be understood that my invention is not limited in its use to motor vehicles. In other words, it is obvious that the device may be used for transmitting movement from any source of rotative movement to a device to be driven.

Rotatably mounted in the casing 1 and keyed or otherwise fixed to the shaft 8 is a driving rotor 10. The driving rotor is preferably cast as a single unit and includes a hub 11. Fixed on the hub 11 near its outer end and extending axially within the casing is a housing element 12. The housing element is of substantially bowl shape in cross section and includes a straight rear wall 13 and an annular wall 14 which has a substantially straight outer surface 15 and a medially disposed thickened portion 16 which defines arcuate portions 17 and 18, the purpose of which will be set forth in more detail hereinafter. As will be noted, the free edge or rim 19 of the wall 13 is slightly curved inwardly to overhang a portion of the driven rotor, to be described hereinafter.

The driving rotor 10 includes a rotor element 20 which is mounted axially of the housing element 12. The element 20 is best seen in Figures 2, 3 and 4 of the drawings and includes a curved rear surface 21 on which are arranged preferably six tangentially disposed agitator members 22. These agitator members are best seen in Figure 3. By referring to this view, it will be seen that said members extend about the curved side wall of the element and to the rear wall 13. The element 20 includes an outer annular portion 23 which has a trough-shaped face 24. As will be seen, the inner rim of the trough-shaped face 24 terminates in the same vertical plane with the inner face of the hub 11. However, the outer rim of the face 24 terminates short of the vertical plane of the inner face of the element 20.

Mounted in the trough-shaped face 24 and arranged in an annular series are vanes 25. As best seen in Figure 4, the vanes 25 are arranged obliquely with respect to the radii of the rotor element and have their corresponding outer edges disposed in the same vertical plane with the inner face of said rotor element. It should be understood that, although I have shown eight of the vanes 25 equally spaced about the trough-shaped face 24, a greater or less number may be employed, if desired.

As best seen in Figure 2, the rotor element 20 is spaced within the housing element 12, so that fluid will be permitted to flow between said elements. Formed in the rotor element 20 and disposed substantially tangentially with respect to the hub 11 are preferably six oblong openings 26. The openings 26 have corresponding edges abutting corresponding edges of the agitators 22 and corresponding opposite edges shaped to merge with the rear surface 21 of the element 20. Also, as best seen in Figures 3 and 4, the openings are annularly arranged with respect to the axis of the hub 11. As best seen in Figure 6, the openings 26 are each flared toward their outer ends, said openings defining notches, as will be made clear during the description of the operation of my invention. As seen in Figure 4, the openings are each provided with a rounded inlet edge 27.

Mounted within the casing 1 and extending into the housing 12, in concentric spaced relation to the arcuate portion 18 is a driven rotor element 28. The driven rotor element 28 includes an integral axially disposed shaft 29 which is journaled by the bearing 7. Said element 28 also includes a hub 30 which is formed with an axial socket 31 into which projects the end of the shaft 8, for rotative movement therein. The driven element 28 includes a rim 32 which is formed with a curved outer surface 33. Formed in the rim 32 and confronting the portion 24 is an annular trough 34, the outer rim of which terminates short of the inner surface of the rotor element. Mounted in the trough 34 and arranged substantially tangentially with respect to the inner edge of the rim are vanes 35, said vanes being ten in number. It should be understood that a greater or less number of vanes may be used, as desired.

As best seen in Figure 2, the driven rotor has its curved outer face 33 disposed in spaced relation to the curved portion 18, said curved portion extending throughout the major portion of the thickness of said driven rotor. Formed in the driven rotor are blades 36. As best seen in Figure 5, the blades 36 are arranged tangentially with respect to the hub 30 and are disposed at an angle to the axis of said hub, with the result that openings 37 will be defined, said openings, as best seen in Figure 6, being adapted to aline with the openings 26.

The operation of this embodiment of the invention will now be set forth.

Fluid of a well known type is first placed in the casing 1. As stated hereinbefore, the shaft 8 is connected with a source of driving power while the shaft 29 is connected with a device to be driven. As rotative movement is imparted to the shaft 8, the driving rotor 20 will be rotated in the casing. As the driving rotor is rotated, the housing element 12 is rotated with the rotor element 23 and with respect to the driven rotor element 28. As the liquid is caused to circulate in the casing 1, by rotation of the rotor and housing element, said liquid will be engaged by the members 22 and as the fluid passes toward the open side of the housing a portion thereof will be directed between the rotors and keep the troughs 24 and 34 filled. Fluid is impelled forwardly by the driving rotor to act upon the blades 35 of the driven rotor 28 and impart rotation to the driven rotor and the relation of the two troughs and the blades therein causes turbulence to be imparted to the fluid and a vortex created which causes added driving force to be imparted to the fluid so that the driven rotor will be rotated in a very efficient manner. As previously stated, the fluid picked up by the members 22 keeps the troughs filled, striking blades 35 and assisting to rotate the driven rotor. During rotation of the rotors fluid moves between the housing 12 and said driven member 28, and between casing 1 and said driven member 28 and through the openings 37 in the driven member. Thence, the fluid moves through the openings 27 and the openings 26 in the driving element to the inner end of said openings and thence back to the starting point, which was the mean radius of the member 22. It will thus be seen that rotative movement will be communicated between the driving and driven elements. Attention is directed to the fact that the housing element 12 will concentrate the liquid about the driving and driven elements with the result that maximum effect of the liquid on the elements will be assured with, of course, the result that maximum power transfer of the driving element to the driven element will be effected.

By way of summarizing, it may be said that, in its simplest form, my device contemplates the provision of driving and driven elements which set up a series of adjacent rotating rings of liquid, which rings of liquid are augmented in their rotation by a centrifugally impelled additional flow of liquid which has turbulent contact with the outer surfaces of the rings at substantially right angles to the radii of the rings and parallel to their direction of rotation. Since the casing 1, as a whole, acts as a reservoir, the member 20 has in reality a suction intake through the openings 37 and 26 with the result that fluid in motion will impinge on the blades 36, thus adding to the rotative movement of the driven member.

In Figures 7 through 11, I have illustrated a slightly modified embodiment of the invention. The numeral 50 indicates a casing which is similar to the casing 1 and includes mating sections 51 and 52 which are of substantially hemispherical shape and which include flanges 53. Bolts 54 extend through the flanges for rigidly connecting the sections. Formed on the section 51, axially thereof, is a boss which defines a bearing 55. A bearing 56 is carried on the section 52 and is axially alined with the bearing 55.

Rotatably mounted in the casing 1 and extending through the section 51 and into the section 52 of said casing, and journaled by the bearing 55, is a driving shaft 57 which is to be connected with a driving element of a motor or the like. Keyed or otherwise rigidly secured to the shaft 57 is a driving rotor 58. The driving rotor 58 includes a housing element 59 and a rotor element 60. As best seen in Figure 8, the rear wall of the housing element 59 is cut away throughout the major portion of its area to define a relatively large axial opening 61. The housing element 60 is disposed concentrically of the casing and extends from within the section 51 into the section 52. Like the housing element 12, the housing element 59 is formed with a thickened circumferential portion 62 which defines curved annular surfaces 63 and 64.

The driving rotor element 60 is mounted axially of the housing element 59 by means of vanes 65. As best seen in Figure 7, the vanes are arranged in a circumferentially spaced series and extend to the rear edge of the housing element, within the opening 61. As will be seen in Figure 8, the curved outer rim of the element 60 is disposed in spaced relation to the curved surface 64 of the housing element, for reasons which will be made more apparent hereinafter.

Formed in the rim of the element 60 is an annularly disposed semi-circular trough 66 and mounted in the trough, as best seen in Figure 10, are vanes 67 which are arranged in an annularly spaced series and are extensions of the vanes 65, said vanes and their extensions being mounted in radial slots in the element 60.

Mounted in the casing 50, to cooperate with the driving rotor 58, is a driven rotor 67'. The driven rotor includes a shaft 68 which is journaled by the bearing 56. As best seen in Figure 8, the element 67' is disposed largely within the housing element 59 with the curved surface 63 in spaced relation to the outer rim of said element 67'. Formed in the inner face of the element 67' is an axial socket 69 which receives, rotatably, the end of the shaft 57. It will thus be seen that the shaft 57 cooperates with the shaft 68 for rotatably mounting the driven rotor element 67' in proper spaced relation to the driving rotor element.

Formed in the outer rim of the element 67' and confronting the trough 66 is a channel or trough 70, the outer rim of which is cut back, as shown at 71 to define an annular opening 72. Mounted in the trough 70 and disposed in an annular series are blades 73. The blades 73, as best seen in Figure 9, are arranged substantially tangentially with respect to the hub of the element 67'. Also, said blades are disposed at an angle to the axis of the shaft 68 and at an angle to the radius of the element. I have shown twelve of the blades in the trough 70 but it should be understood that a greater or less number of them may be employed as desired.

The operation of this embodiment of the invention is somewhat similar to that of the preferred form. When the driving rotor is turned, fluid is drawn into the housing 59 through the opening 61 and the vanes 65 move it toward the thickened portion 62 which directs the fluid between the rotors and into the troughs 66 and 70, where it is set into turbulent motion by the blades 67 and acts upon the blades 73 to impart rotation to the driven rotor. As the driven rotor rotates, a portion of the fluid is forced through the annular passage 72 and back into the space between the rotor as a whole and walls of the casing. Flow of fluid into the pockets keeps them filled and the incoming fluid acts upon the blades 73 to assist in imparting rotative movement to the driven rotor. This rotative movement will be in addition to that imparted from the blades 67 to the blades 73.

Attention is directed to the fact that, in view of the provision of the annular opening 72, liquid will be permitted to pass from between the blades 67 and 72 into the casing for further circulation.

Attention is also directed to the fact that, in the first described embodiment, the casing serves as a reservoir and the driving member has a suction intake which adds to the rotative motion of the driven member.

It should also be understood that various modifications in design and details of construction may be made without departing from the spirit of the invention.

Having thus described the invention, what is claimed as new is:

1. An hydraulic transmission mechanism including a casing, a shaft rotatably mounted through one side of the casing, a driving rotor fixed to rotate on the shaft within the casing, a driven rotor having a hub formed with a socket to rotatably receive the inner end portion of the shaft, said driven rotor having an integral shaft axially disposed with respect to the first mentioned shaft and rotatably mounted through the other side of the casing, said driving rotor having a transversely semi-circular annular trough in its inner side face, vanes in the trough, said driven rotor having a trough in its inner side face opposite the trough of the driving rotor, blades in the trough of the driven motor, the outer rim of said last mentioned trough being cut back to define an annular opening, an annular housing element for the driving rotor formed with a side opening concentric with the driving rotor and overlapping the periphery of the driven rotor, said housing having an inwardly thickened transversely tapered portion paralleling the space between the rotors, and blades operatively connecting the housing element with said driving rotor and extending radially along the outer side face of the driving rotor and across the peripheral face thereof.

2. An hydraulic transmission mechanism including a casing, a shaft rotatably mounted in the casing, a driving rotor fixed to rotate on the shaft within the casing, a driven rotor having a hub formed with a socket to rotatably receive the end portion of the shaft, said driven rotor having an integral shaft axially disposed with respect to the first mentioned shaft and journaled by the casing, said driving rotor having its inner side face formed with a semi-circular trough, vanes in the trough, said driven rotor having a trough in its inner side face opposite the trough of the driving rotor, blades in the last mentioned trough, a housing element for the driving rotor overlapping the periphery of the driven rotor and formed with an inwardly thickened portion between the rotors, said housing element having an outer side opening concentric with the driven rotor, and blades extending radially of the driving rotor and operatively connecting the housing element with the rotor element of said driving rotor, the opening in the outer side wall of the housing constituting an inlet for admitting centrifugally impelled liquid and the thickened portion of the housing serving to direct the said liquid between the rotors for impinging on said last mentioned vanes and adding to the rotative movement of the driving rotor.

GEORGE F. HALL.